(12) United States Patent
Thiel et al.

(10) Patent No.: US 7,908,514 B2
(45) Date of Patent: Mar. 15, 2011

(54) MINIMIZING DATA LOSS IN ASYNCHRONOUS REPLICATION SOLUTION USING DISTRIBUTED REDUNDANCY

(75) Inventors: Gregory Thiel, Black Diamond, WA (US); Alexander R. Wetmore, Seattle, WA (US); Shawn Bracewell, Duvall, WA (US); Rebecca Benfield, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 12/146,602

(22) Filed: Jun. 26, 2008

(65) Prior Publication Data

US 2009/0327805 A1 Dec. 31, 2009

(51) Int. Cl.
*G06F 11/00* (2006.01)
(52) U.S. Cl. .................... 714/15; 714/6; 714/16
(58) Field of Classification Search ............... 714/6, 15, 714/16
See application file for complete search history.

(56) References Cited

U.S. PATENT DOCUMENTS

| | | | |
|---|---|---|---|
| 5,933,653 A * | 8/1999 | Ofek | 710/6 |
| 6,615,223 B1 | 9/2003 | Shih et al. | |
| 6,658,590 B1 * | 12/2003 | Sicola et al. | 714/6 |
| 6,675,217 B1 * | 1/2004 | Dani et al. | 709/229 |
| 6,993,537 B2 | 1/2006 | Buxton et al. | |
| 7,111,189 B1 * | 9/2006 | Sicola et al. | 714/6 |
| 7,260,590 B1 * | 8/2007 | Williams | 707/615 |
| 7,278,049 B2 | 10/2007 | Bartfai et al. | |
| 7,305,421 B2 | 12/2007 | Cha et al. | |
| 7,529,964 B2 * | 5/2009 | Suzuki et al. | 714/5 |
| 7,716,518 B2 * | 5/2010 | Butterworth et al. | 714/4 |
| 7,774,646 B2 * | 8/2010 | Smith et al. | 714/13 |
| 2005/0165851 A1 * | 7/2005 | Goyal | 707/200 |
| 2006/0179347 A1 * | 8/2006 | Anderson et al. | 714/16 |
| 2006/0271815 A1 * | 11/2006 | Mizuno et al. | 714/6 |
| 2007/0061531 A1 | 3/2007 | Bartfai et al. | |
| 2007/0143366 A1 | 6/2007 | D'Souza et al. | |
| 2007/0162516 A1 | 7/2007 | Thiel et al. | |
| 2007/0234108 A1 | 10/2007 | Cox et al. | |
| 2008/0126845 A1 * | 5/2008 | Luo et al. | 714/6 |
| 2009/0271658 A1 * | 10/2009 | Aidun | 714/6 |
| 2010/0131795 A1 * | 5/2010 | Hirakawa et al. | 714/6 |

OTHER PUBLICATIONS

"Exchange 2007 Best Practices for Minimizing the Impact of a Disaster", Microsoft Technet, 2008, Microsoft Corporation.
Mikkelsen, et al., "Ensuring Data Integrity with Asynchronous Replication", Jul. 2005, Hitachi Data Systems Corporation.

\* cited by examiner

*Primary Examiner* — Marc Duncan

(57) ABSTRACT

Architecture that reduces data loss resulting from failover in an asynchronous log shipping deployment, but leveraging mid-tier and frontend servers to fill in lost data. In an asynchronous log shipping operation, a replication component asynchronously replicates messaging data to a backend server in accordance with one or more replication operations, which can be updates to databases on the backend server. These databases can include messaging data, such as email address books, mailboxes, etc. A history component maintains a history of replication operations on a frontend server. In the event of a lossy failover, a replay component is used for replaying the replication operations from the history to the backend server.

20 Claims, 14 Drawing Sheets

MINIMIZING DATA LOSS IN ASYNCHRONOUS REPLICATION SOLUTION USING DISTRIBUTED REDUNDANCY

BACKGROUND

Large messaging solutions are typically deployed across multiple machines, creating a distributed solution. The storage component of a solution oftentimes requires a replication solution to protect against outages and/or data loss due to failures within the system.

Asynchronous log shipping has been used to provide an effective replication solution at a relatively low cost. However, asynchronous log shipping can experience data loss in the event of failure. This is because the asynchronous nature of the solution does not guarantee that all changes performed by an active data copy are immediately replicated to other servers. Users are thus forced to make a tradeoff between these recovery characteristics versus costs and complexity.

An email deployment can employ redundant frontend and backend servers, where mailbox storage is provided by the backend servers. The frontend servers can provide protocol services (e.g., POP and IMAP) and also client access services (e.g., browser-based mail reading and mobile device mail synchronization).

The backend servers can employ asynchronous log shipping to replicate the mail database between the configured copies and use an active/passive mechanism to manage changes to both copies. However, a log shipping solution can result in some amount of user data being lost if a server crash causes a failover.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, architecture is disclosed for a computer-implemented data replication system that reduces data loss resulting from failover in an asynchronous replication (e.g., log shipping) operation. The architecture facilitates the asynchronous replication of data between backend servers.

A short history of recent changes (e.g., replication operations) made to the backend servers is maintained at a storage component (e.g., frontend server, a middle-tier server, etc.). This short history can be resubmitted to the backend servers after the failover at the backend servers has occurred. The architecture facilitates the automatic detection of the lossy failover and initiates resubmission of the recent changes. The history of recent changes is managed by maintaining the history for a short period of time (e.g., the duration of the time used for the changes to be correctly replicated).

By combining asynchronous replication with a short term history of changes, the short term history can be resubmitted on demand to fill in data changes that were lost on failover. These mechanisms can include new object creation and object update cases. The resubmission of the short term history is coordinated with the replication history by integrating a feedback loop. By including replication progress with the history mechanism the burden of information storage and processing is reduced.

The history of recent changes can be maintained on servers for resubmission (e.g., on demand) to the backend servers.

For example, the servers can include frontend severs (e.g., web access) and mid-tier servers (e.g., client access).

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
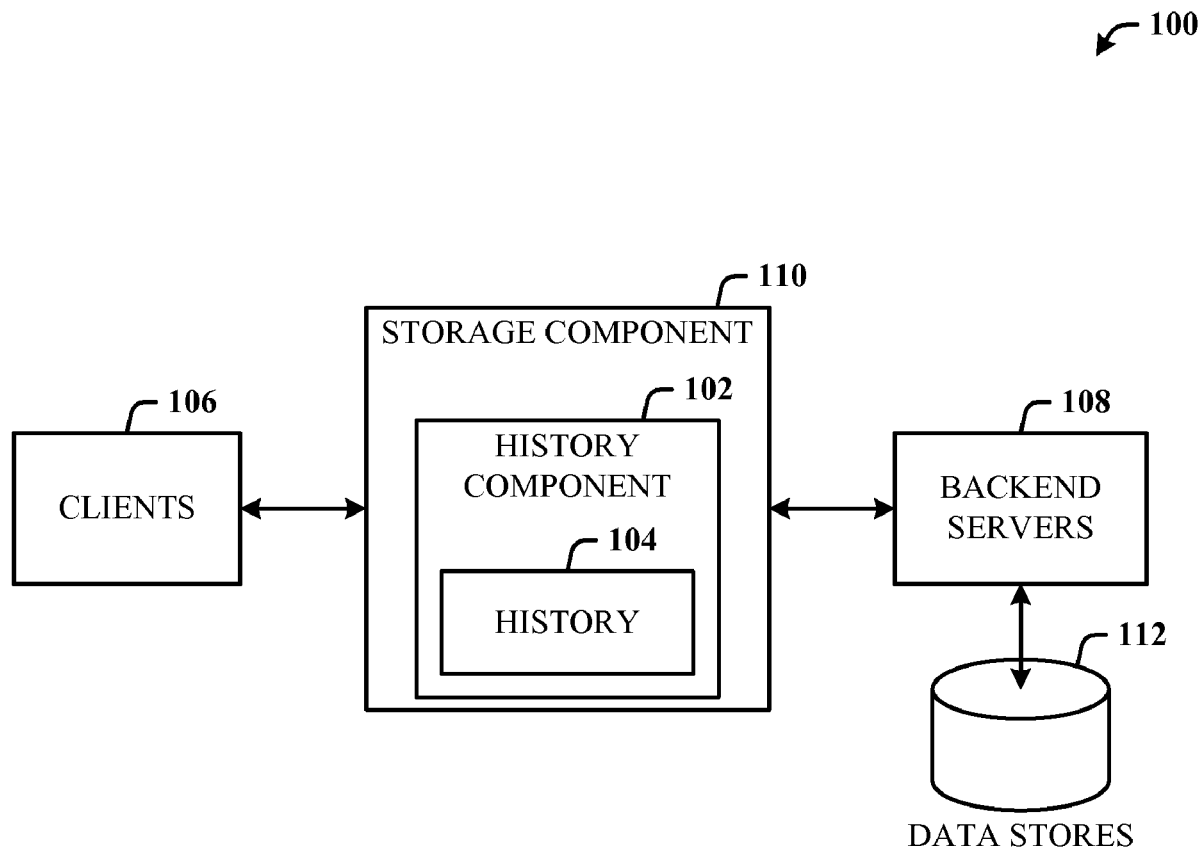
FIG. 1 illustrates a computer-implemented data management system in accordance with the disclosed architecture.

The disclosed architecture relates to a computer-implemented data replication system that reduces data loss resulting from failover in an asynchronous log shipping operation. For example, in an asynchronous log shipping operation in a messaging embodiment, messaging data is asynchronously replicated to backend servers in accordance with one or more replication operations, which can be updates to databases on the backend server. For example, these databases can be associated with messaging data, such as email address books, mailboxes, etc.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented data management system 100 in accordance with the disclosed architecture. The system 100 finds use with a messaging solution (e.g., email address books, mailboxes, etc.). However, it is to be appreciated that the system 100 can also be employed with any type of server-driven database system. The system 100 includes a history component 102 for maintaining a history 104 of changes made by clients 106 to backend servers 108, and a storage component 110 for storing the history 104 of the changes for resubmission of the changes in response to a lossy failover at the data stores 112 of the backend servers 108.

The clients 106 can include applications associated with desktop computers, portable computers, cell phones, and messaging devices, for example, for accessing associated servers, such as frontend servers and mid-tier servers. Applications/servers such as for communications (e.g., email, instant messaging, etc.), collaboration, document management, etc., can benefit from the history and replication processes of the architecture.

Figure 2:
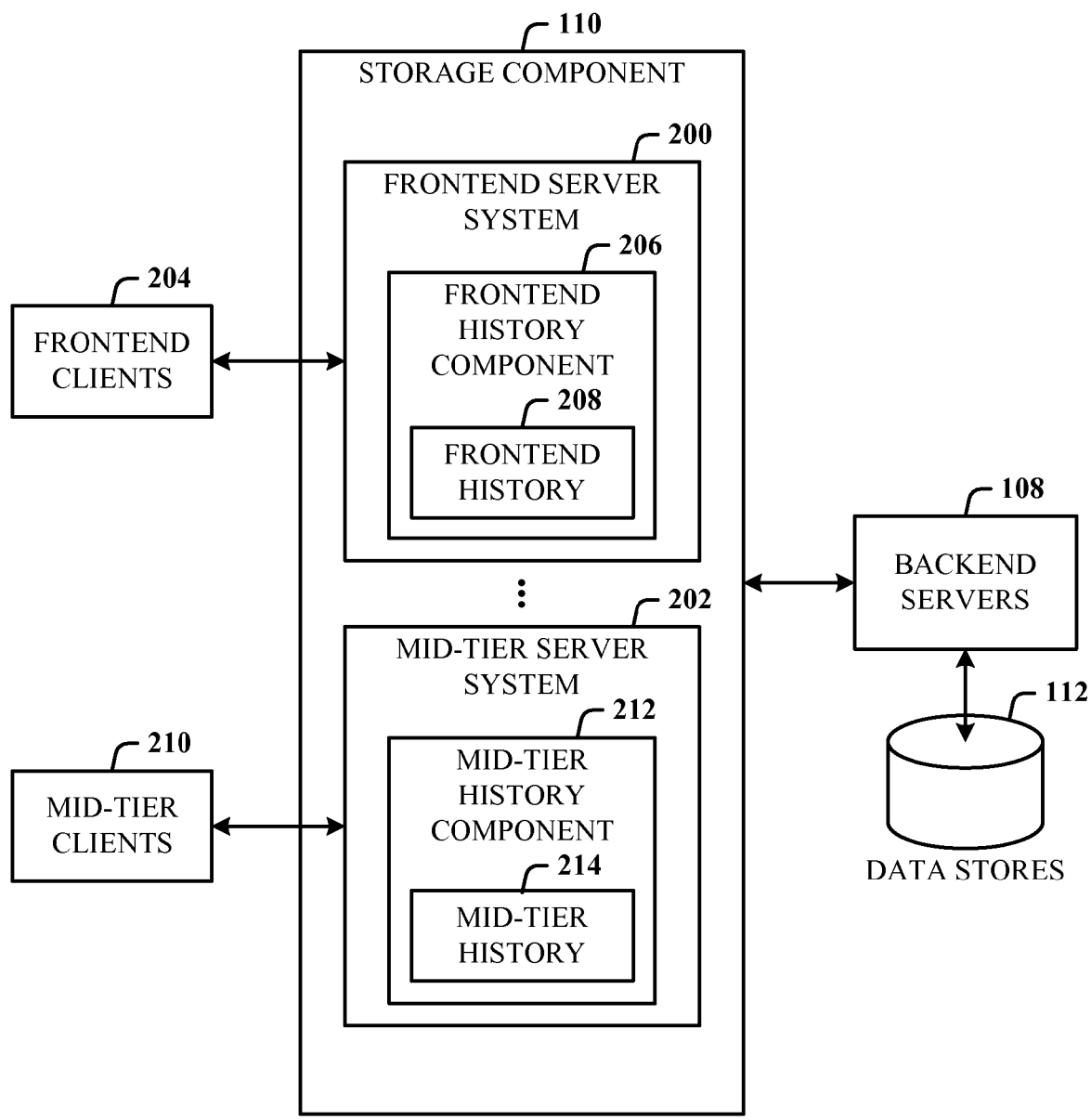
FIG. 2 illustrates a more detailed implementation of the storage component.

FIG. 2 illustrates a more detailed implementation of the storage component 110. The storage component 110 can include storage mechanisms (e.g., chip memory, mass storage, etc.) of a frontend server system 200 as well as the storage mechanisms (e.g., chip memory, mass storage, etc.) associated with a mid-tier server system 202. Thus, changes made to the frontend system 200 by frontend clients 204 will be saved temporarily in a frontend history component 206 as frontend history 208. Similarly, changes made to the mid-tier system 202 by mid-tier clients 210 will be saved temporarily in a mid-tier history component 212 as mid-tier history 214. The histories (208 and 214) are maintained only as needed. For example, as soon as replication processes on the backend servers 108 are deemed to be successful, the histories (208 and 214) are deleted. Note that the histories (208 and 214) do not need to be the entire history of the client interactions or changes, thereby reducing the amount of data stored as the histories (208 and 214). Only recent changes are maintained, as can be determined by time/date information, for example.

Figure 3:
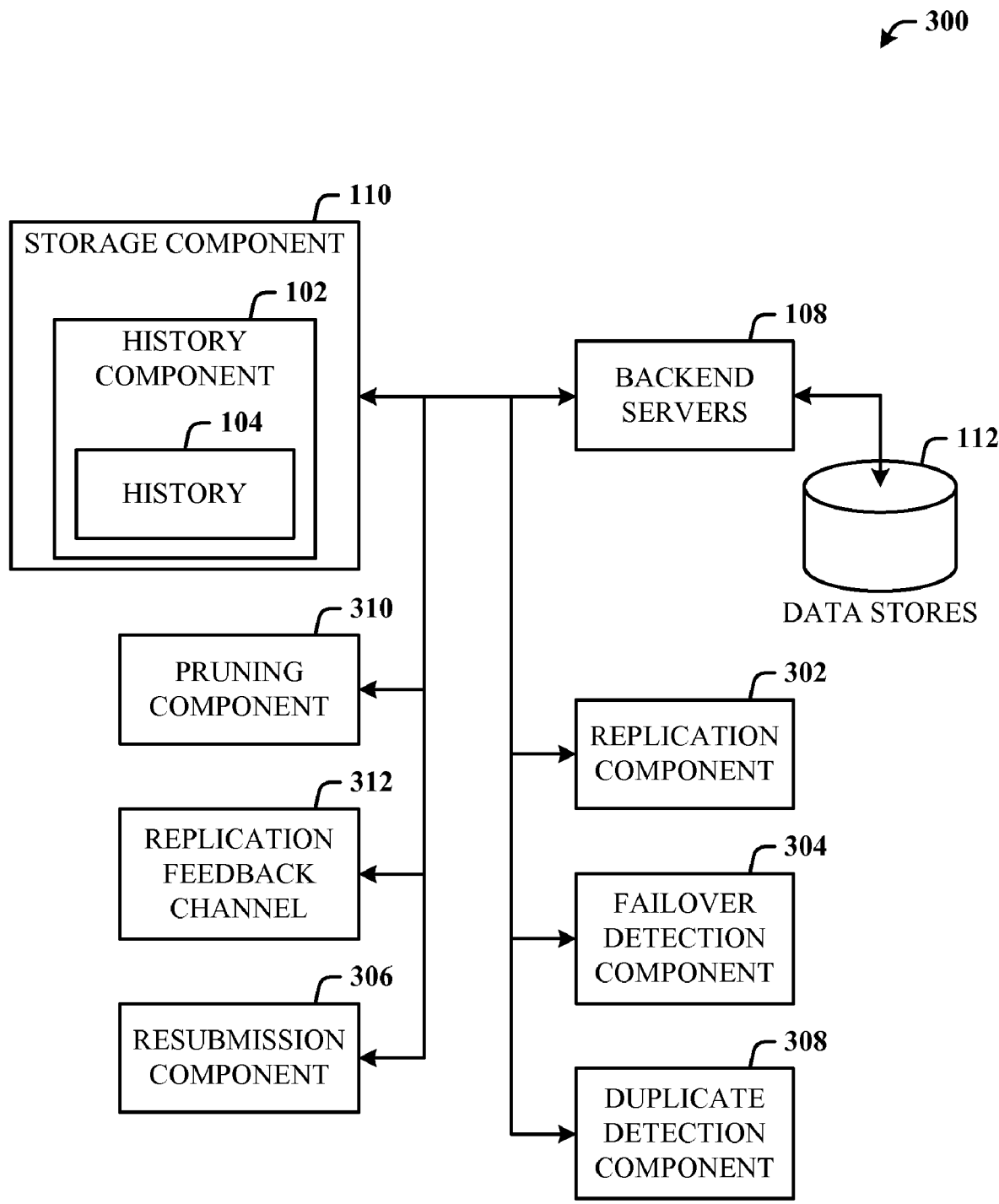
FIG. 3 illustrates additional components for a data management system.

FIG. 3 illustrates additional components for a data management system 300. The system 300 includes a replication component 302 associated with the backend servers 108 for asynchronously replicating changes received at a backend server to the remaining backend servers according to replication operations. The replication operations can include recent changes (updates) received at the backend servers from the frontend servers and/or mid-tier servers as related to log shipping, for example, to one or more of the data stores 112 (also referred to herein as databases) of the backend servers 108. In operation, the mid-tier server, for example, makes a change to the backend database and in the process saves the data locally as well.

A failover detection component 304 detects problems associated with the replication process, such as lossy failover that results in changes (updates) that do not get replicated to one or all of the backend databases during the replication process.

FIG. 3 illustrates that, generally, the replication component 302, failover detection component 304, and duplicate detection component 308 reside local to the backend servers 108. In a more specific depiction, each of the backend servers 108 can include one or more of the components, such as the replication component 302 and failover detection component 304.

On the storage component side, when lossy failover is detected at the backend server 108, a resubmission component 306 queries (or requests) the resubmission of the history 104 from the storage component 110. Note that the history 104 represents a single history file from a single server (e.g., frontend server or mid-tier server) or multiple history files from correspondingly multiple frontend and/or mid-tier servers. Accordingly, the resubmission component 306 (as can be deployed on each frontend server, mid-tier server or groups of such servers) processes requests from the backend servers 108 for history from the frontend/mid-tier servers that contributed to the replicated data on the backend servers 108.

A duplicate detection component 308 monitors and eliminates duplicates during the resubmission process that utilizes the most recent changes according to time window communicated as part of the resubmission request. In other words, if during resubmission an item from the history 104 is determined to be a duplicate of the item already successfully updated on the backend servers 108, the resubmission duplicate will be skipped (or discarded). Resubmission processing then continues to the next recent history item.

A pruning component 310 is provided for pruning outdated changes (or updates) from the history 104. Upon determining a particular time (e.g., based on a timestamp) at which all replication operations are up-to-date and correct, the pruning component 310 removes (or expires) items from the history 104 that are older than that timestamp.

A replication feedback channel 312 defines a time interval for which items in the history 104 will be considered for resubmission. The selected items in the history 104 are pruned (using the pruning component 310) based on the replication feedback channel 312. Resubmission progress is periodically obtained from the backend servers 108, which can be represented as a timestamp (or a logical equivalent) of the changes successfully resubmitted. Items in the history 104 that are older than the provided timestamp can be pruned. The replication feedback channel 312 ensures that the history 104 does not become excessively large according to predetermined criteria. For example, history file sizes in the range of gigabytes can be unwieldy; thus, a file size limit can be imposed (e.g., in addition to, or alternatively, to a time lime) so as to not negatively impact performance and transport input/output.

The history 104 stored in the history component 102 can include operational transactions selected from operations that create a new messaging object, operations that update an existing object, and/or operations that are performed on an original item and are distributed to recipients, such as associated with a messaging implementation for management, replication, and resubmission of email messages.

The backend servers 108 can typically include multiple different databases (e.g., fifty) over which replication losses can occur and for which losses can be different from database to database, and resubmission processing accommodates this situation by properly handling duplicates. Once the resubmission process has been deemed successful, the recent change items in the history 104 can be pruned or the history 104 deleted entirely. For efficiency, the history 104 can be maintained by the history component 102 no longer than the duration of the time utilized to resubmit the changes. This can be on the order of minutes, or less, for example.

By configuring the history component 102 to interact with the mid-tier servers and frontend servers, the history of committed changes maintained in the history 104 is outside the transactional storage infrastructure of the backend servers 108, and is able to fill in missing changes in the event of replication failover.

Figure 4:
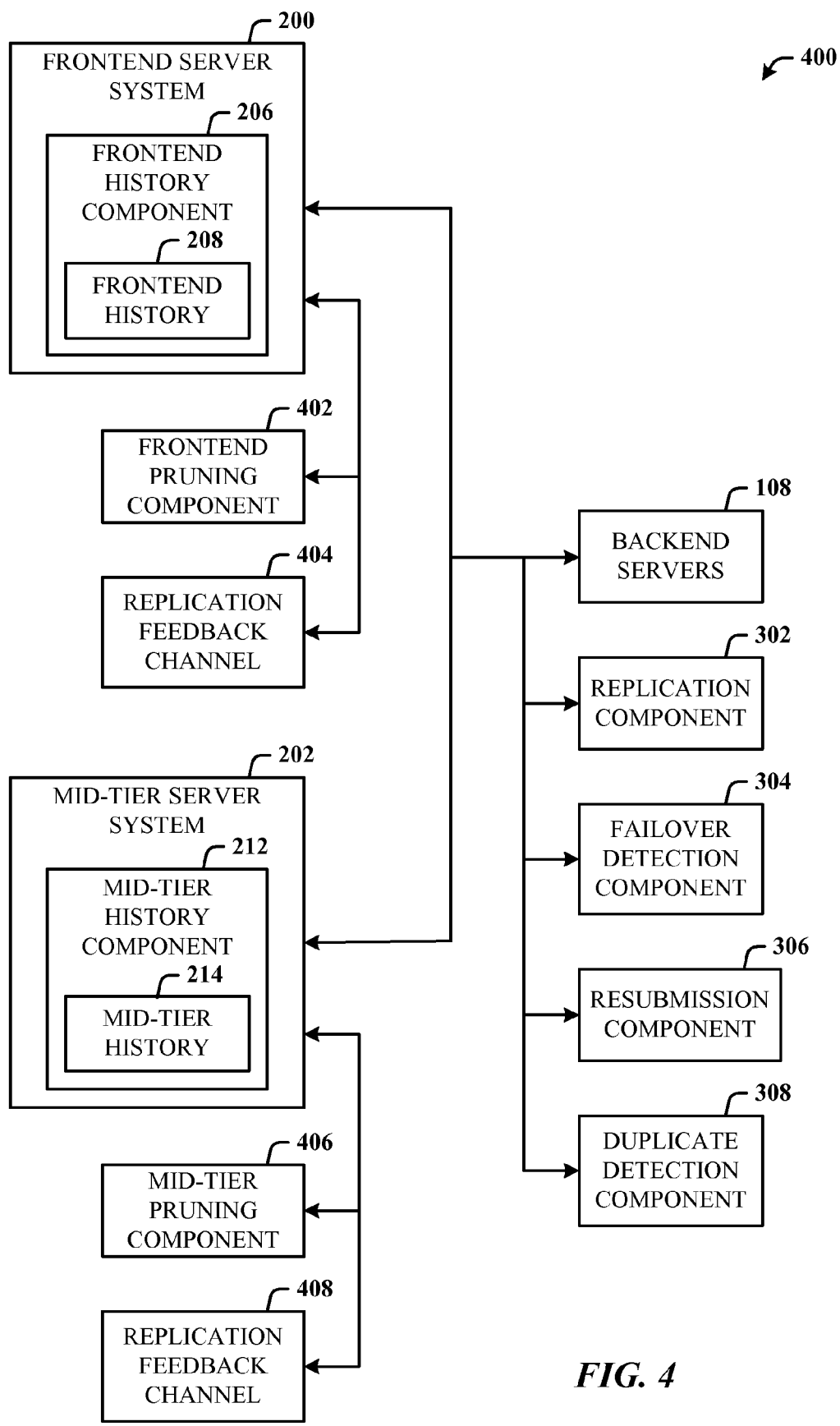
FIG. 4 illustrates a more detailed system showing frontend and mid-tier server systems that employ pruning and replication feedback for minimizing data loss.

FIG. 4 illustrates a more detailed system 400 showing frontend and mid-tier server systems that employ pruning and replication feedback for minimizing data loss. The system 400 includes the frontend server system 200, and the associated frontend history component 206 for storing frontend change history 208 by frontend clients. Additionally, the system 400 includes the mid-tier system 202, the associated mid-tier history component 212 for saving recent mid-tier client changes in the mid-tier history 214.

The frontend server system 200 is further associated with a frontend pruning component 402 for pruning the frontend history 208, and a frontend replication feedback channel 404 for receiving and processing progress information related to the processing of change resubmissions from the frontend history 208 to the backend servers 108. Similarly, the mid-tier server system 202 is further associated with a mid-tier pruning component 406 for pruning the mid-tier history 214, and a mid-tier replication feedback channel 408 for receiving and processing progress information related to the processing of change resubmissions from the mid-tier history 214 to the backend servers 108. The backend servers 108 components (302, 304 and 308) operate according to the previous description of the system 300 of FIG. 3.

Figure 5:
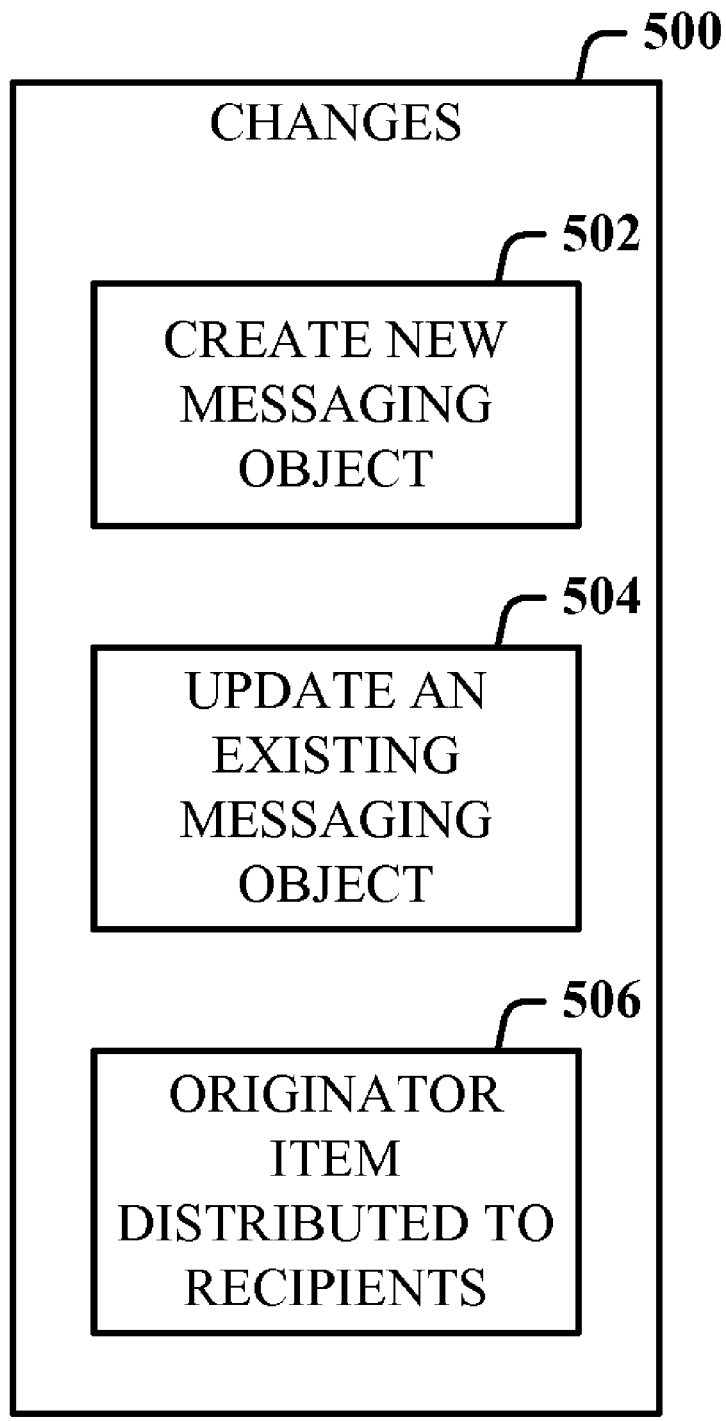
FIG. 5 illustrates an alternative embodiment of the changes performed by the computer-implemented data management system.

FIG. 5 illustrates an alternative embodiment of the changes 500 performed by the computer-implemented data management system. The changes 500 can be distinguished into three groups, for example, and be processed in an interspersed way. Group One changes 502 are related to creating a new messaging object. The Group One changes can include a new appointment, contact, task and/or a draft message, for example. Group Two changes 504 are related to updating an existing object. Group Three changes 506 are related to ensuring that items of an originator are accounted for and can be resubmitted if received by a recipient entity, but not showing in the sender's message store. The originator is included in the distribution of updates through the messaging service, for example, so that all involved parties receive and see the change.

Included herein are flow charts that are representative of methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
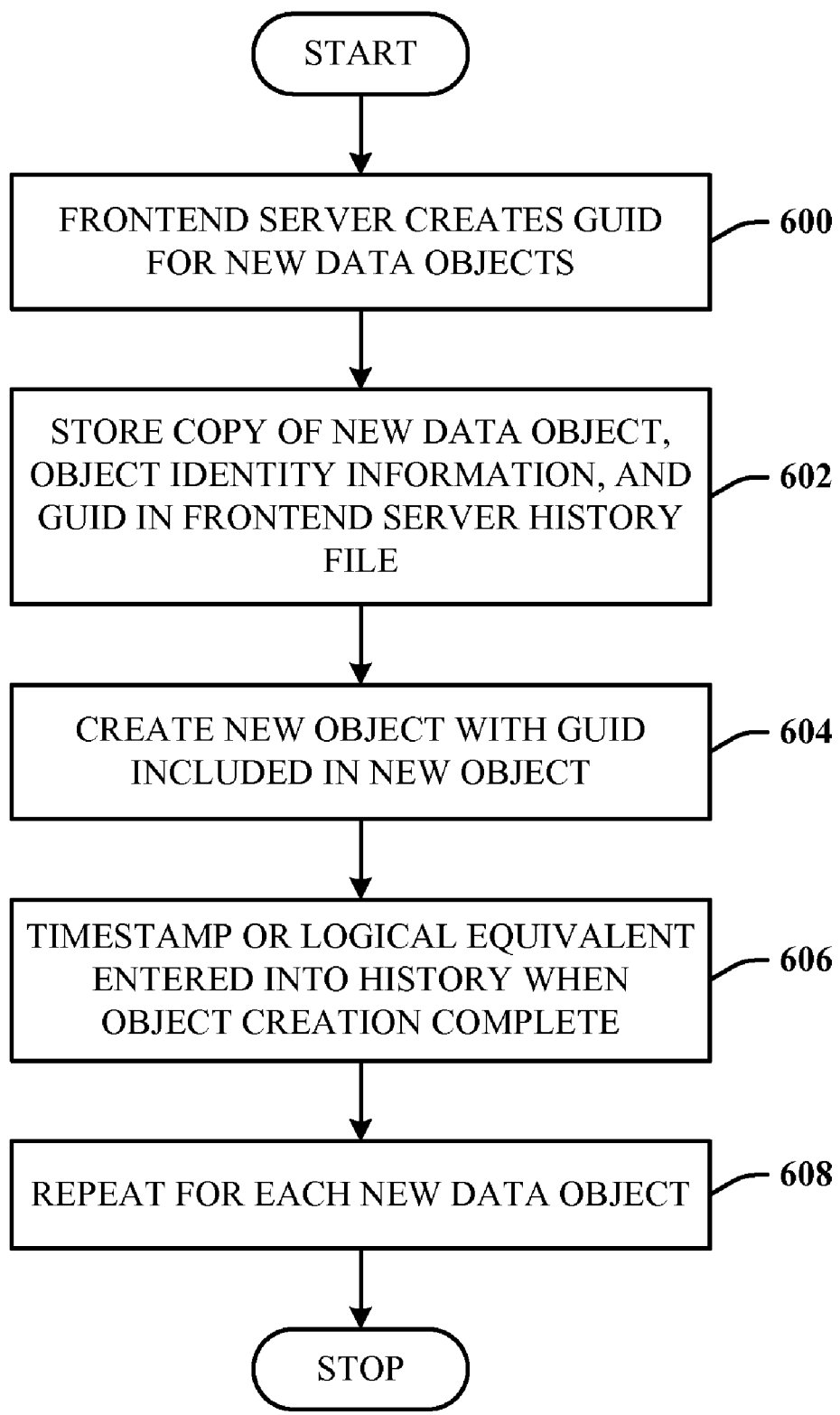
FIG. 6 illustrates a method of processing Group One changes.

FIG. 6 illustrates a method of processing Group One changes. The description is in the context of a frontend server; however, it applies equally as well to a mid-tier server. As described hereinabove, the Group One changes are related to the creation of a new data object (e.g., messaging). At 600, a frontend server creates a globally unique ID (GUID) for all new objects created. A variation to this flow is that the backend server creates the GUID and returns the GUID to the requester (e.g., frontend server, mid-tier server, etc.), at which point, the requestor inserts the GUID into the history. At 602, a copy of the new data object, along with identity information of the data object and GUID, are stored in the frontend server history file. The GUID is a portion of feedback from a backend server. Upon resubmission of some or all of the history, the GUID is provided back to the backend servers or used by the frontend server.

At 604, the new object is created with the GUID included in the object. If the object fails to be created due to anything other than a service failure then the history object is flagged as "failed to be created." At 606, a timestamp, or logical equivalent, is entered in the history when the creation operation completes. This behavior continues for each new object, as indicated at 608.

Figure 7:
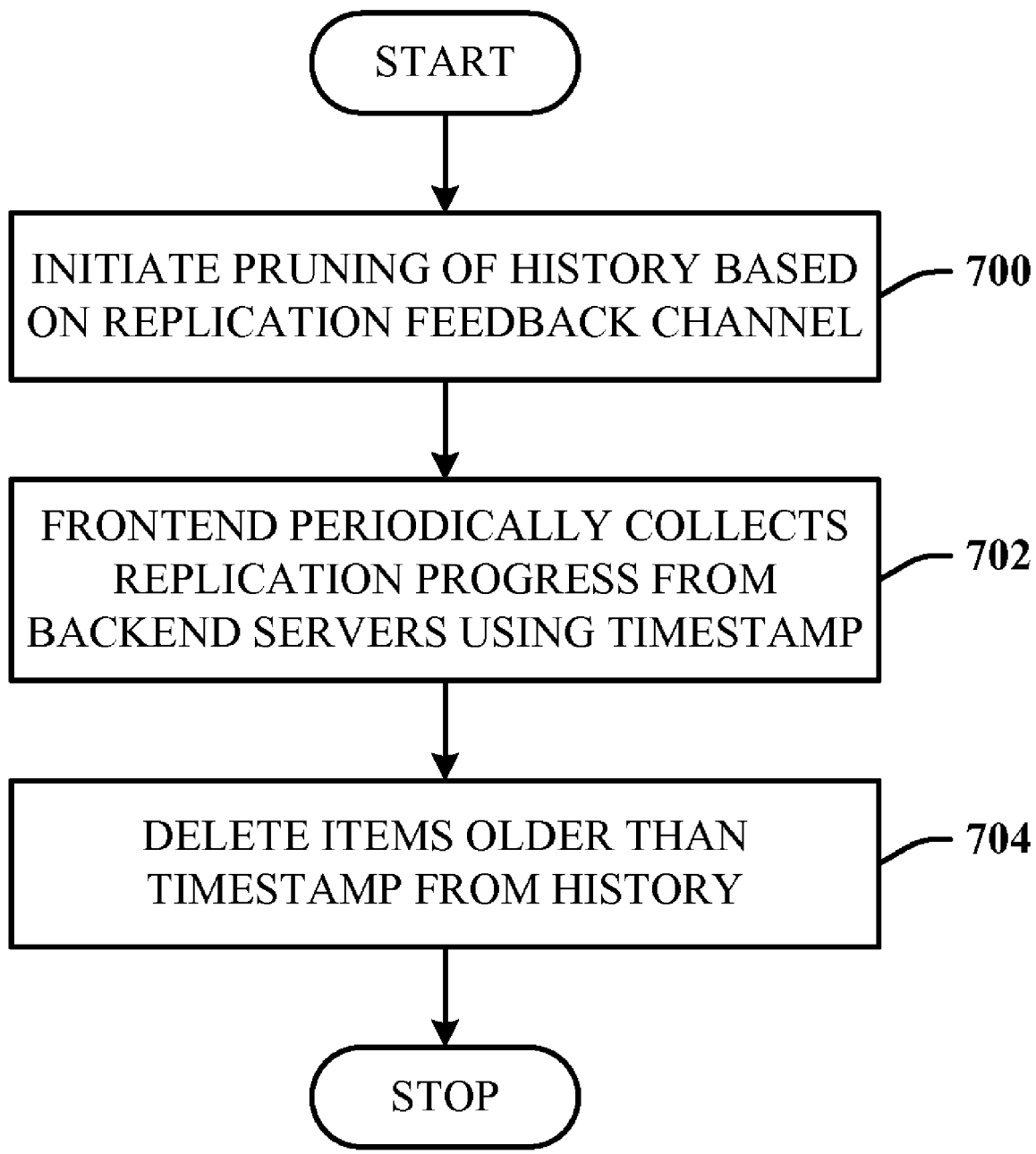
FIG. 7 illustrates a method of pruning the history based on replication progress.

FIG. 7 illustrates a method of pruning the history based on replication progress. The pruning component prunes the history based on the replication feedback channel. At 700, pruning of the history on the frontend server is initiated based on the replication feedback channel. At 702, the frontend server periodically collects replication progress from the backend server via the feedback channel. This progress can be logically represented as a timestamp (or other logical equivalent) of the changes successfully applied. At 704, items older than the provided timestamp can be deleted from the history.

Figure 8:
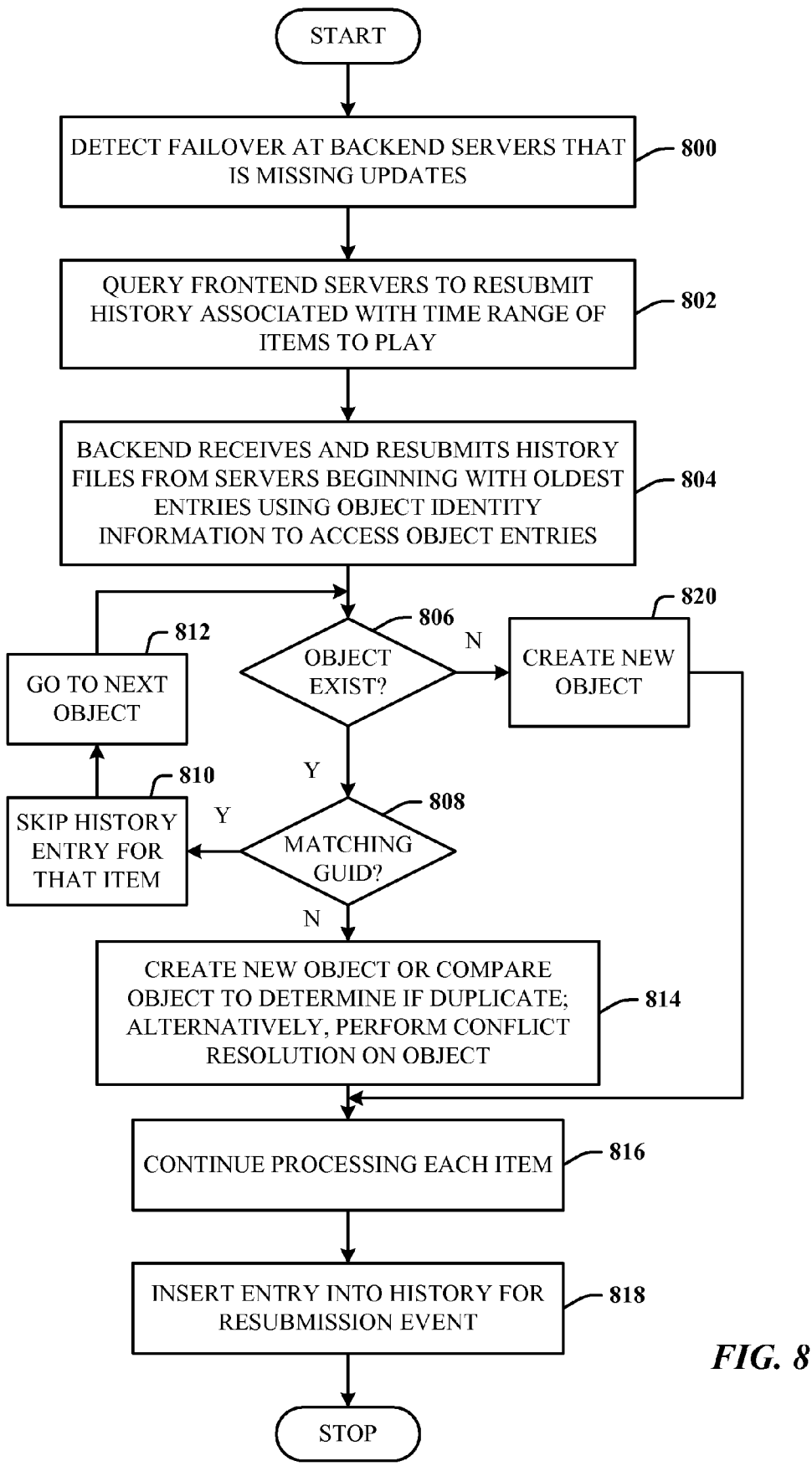
FIG. 8 illustrates a method of processing a detected failover at the backend servers.

FIG. 8 illustrates a method of processing a detected failover at the backend servers. At 800, the detection component detects failover that does not include all backend database updates. At 802, the frontend servers are queried to resubmit the associated history, the query including the time range of the items to play. The frontend servers hold history data for an amount of time, alternatively or in combination therewith, a certain amount of space, in order to simplify deployment and management. At 804, the resubmission component resubmits the history files from the frontend servers beginning with the oldest entry in the files, and using the object identity information to access the object. At 806, a check is made for the object, and if the object exists, a check is made at 808 for a matching GUID. If a matching GUID exists, flow is to 810 where the history entry is skipped. At 812, the next entry in the history is selected and flow is to 806 to repeat the process. If the object exists (at 806), but has a different GUID, flow is from 808 to 814 where the new object is created or the object is compared to determine if it is identical. At 816, continue processing for each item. At 818, the resubmission event of the history is also placed into the history in case a new failover occurs. If at 806, an object does not exist, flow is to 820 to create a new object. Flow is then to 816 to continue processing, as before.

Figure 9:
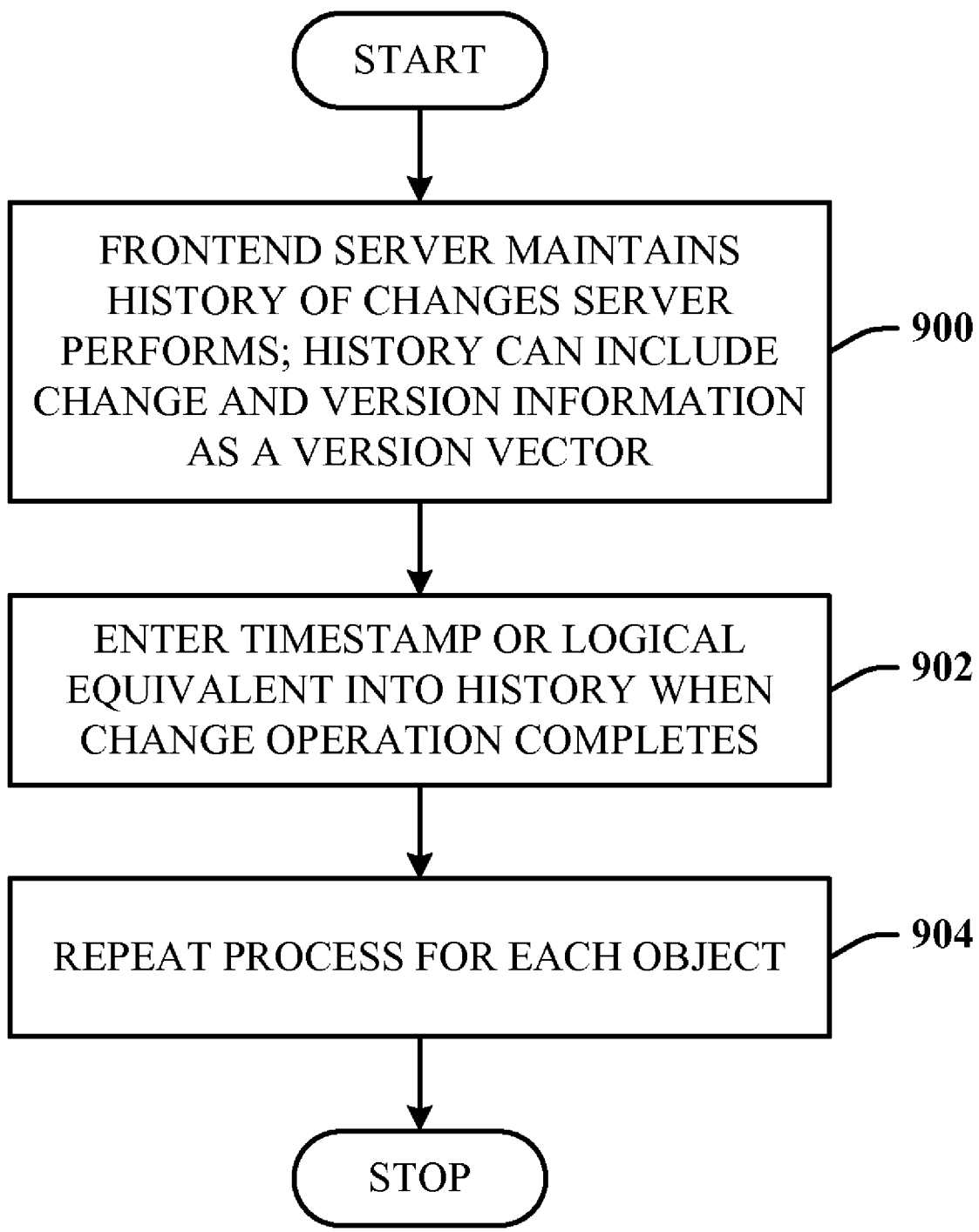
FIG. 9 illustrates a method of updating an existing object.

As described hereinabove, the Group Two changes include changes that update an existing messaging object. FIG. 9 illustrates a method of updating an existing object. At 900, the frontend server maintains a history of the changes the server performs. The history includes the change and version information of the backend object at the time of the change. The version information can be provided as a version vector, which is returned by the backend to be saved in the history. The version information is used to detect conflicts and/or determine if the change has already been performed. At 902, a timestamp or the like is entered in the history when the update operation completes. At 904, this process is repeated for every object.

The version information describes how an object has been changed. The sets of version pairs are compared to determine whether or not the changes are present at the backend servers. When a change is made, there is feedback from the backend servers indicating a version of an object created with that change. Upon replay following a lossy failover, the version information and the information describing the change are compared to determine if the associated operation is present on the backend server. An operational mechanism for processing Group Two changes is explained as follows.

The pruning component prunes the history in the same way as for the Group One changes described above. Similarly, failover detection and processing can be the same as described above for the Group One changes.

Figure 10:
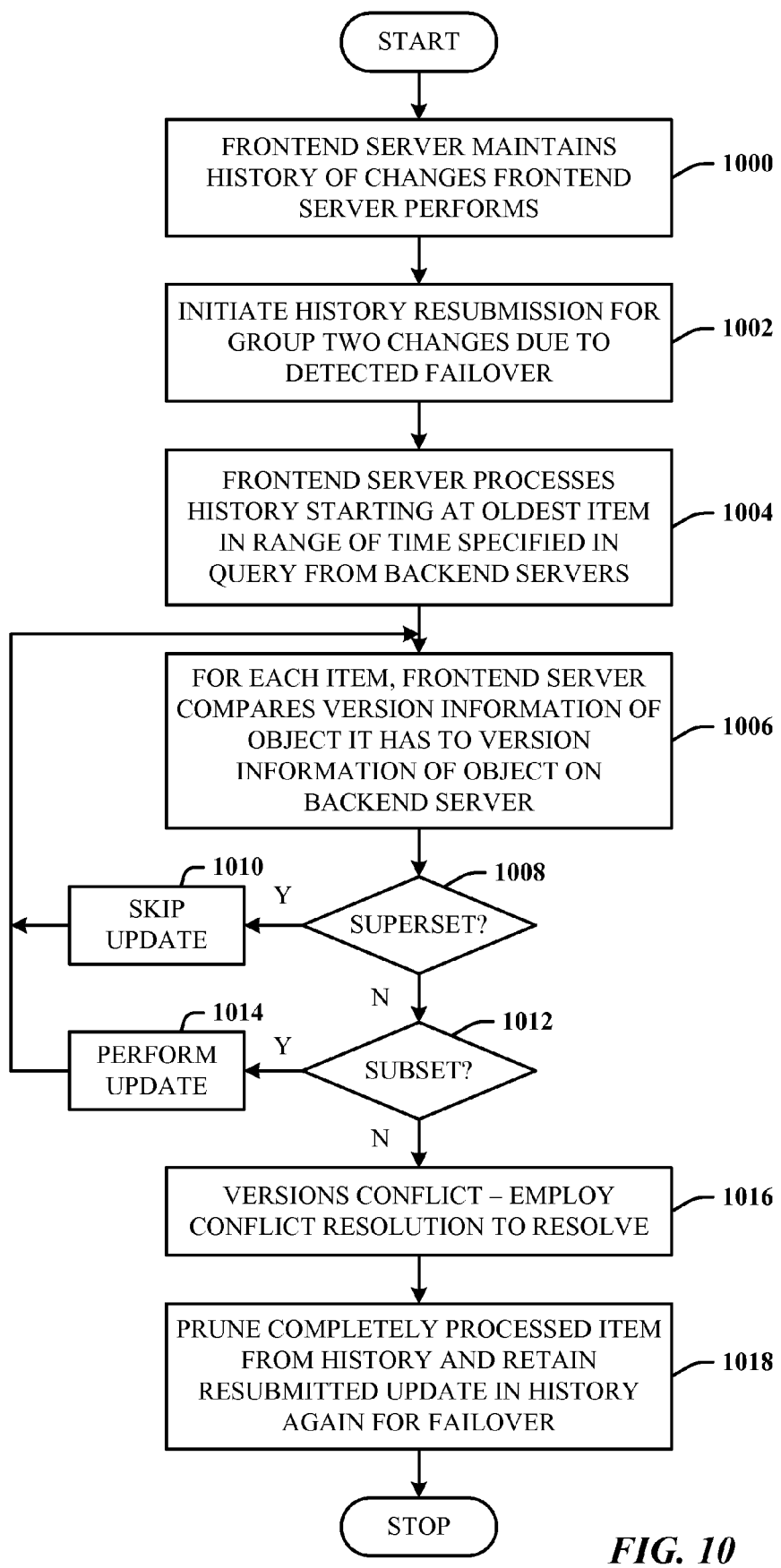
FIG. 10 illustrates a method of resubmitting history for Group Two changes.

FIG. 10 illustrates a method of resubmitting history for Group Two changes. At 1000, the frontend server history component is configured to maintain the history for a predetermined period of time and/or according to predetermined file size. At 1002, history resubmission is initiated for the Group Two changes. At 1004, the frontend server processes the history starting at the oldest item within the range of time specified in the query from the backend servers. At 1006, for each item, the frontend server compares the version information for object it has to the version information of the object on the backend server.

At 1008, if the version information of the backend object shows the version to be a superset of the object from the history, flow is to 1010, where the update is skipped. Flow is then back to 1006 to continue processing items. If the version on the backend servers is a subset of the history's version, as indicated at 1012, then flow is to 1014, where the update is performed. Flow is then back to 1006 to continue processing items. If two versions are not a superset or a subset, flow is from 1012 to 1016, where the versions are determined to be in conflict, and then conflict resolution is employed on the two items to resolve the conflict. At 1018, completely processed items are pruned according to the pruning procedure described herein, and resubmitted updates are retained in the history again for failover.

Version information can be maintained as a vector of the entities that perform the updates. For example, the backend server is represented as one element of the vector, each caching client is represented as another entry, and optionally, each frontend server can also be another entry in the vector.

Figure 11:
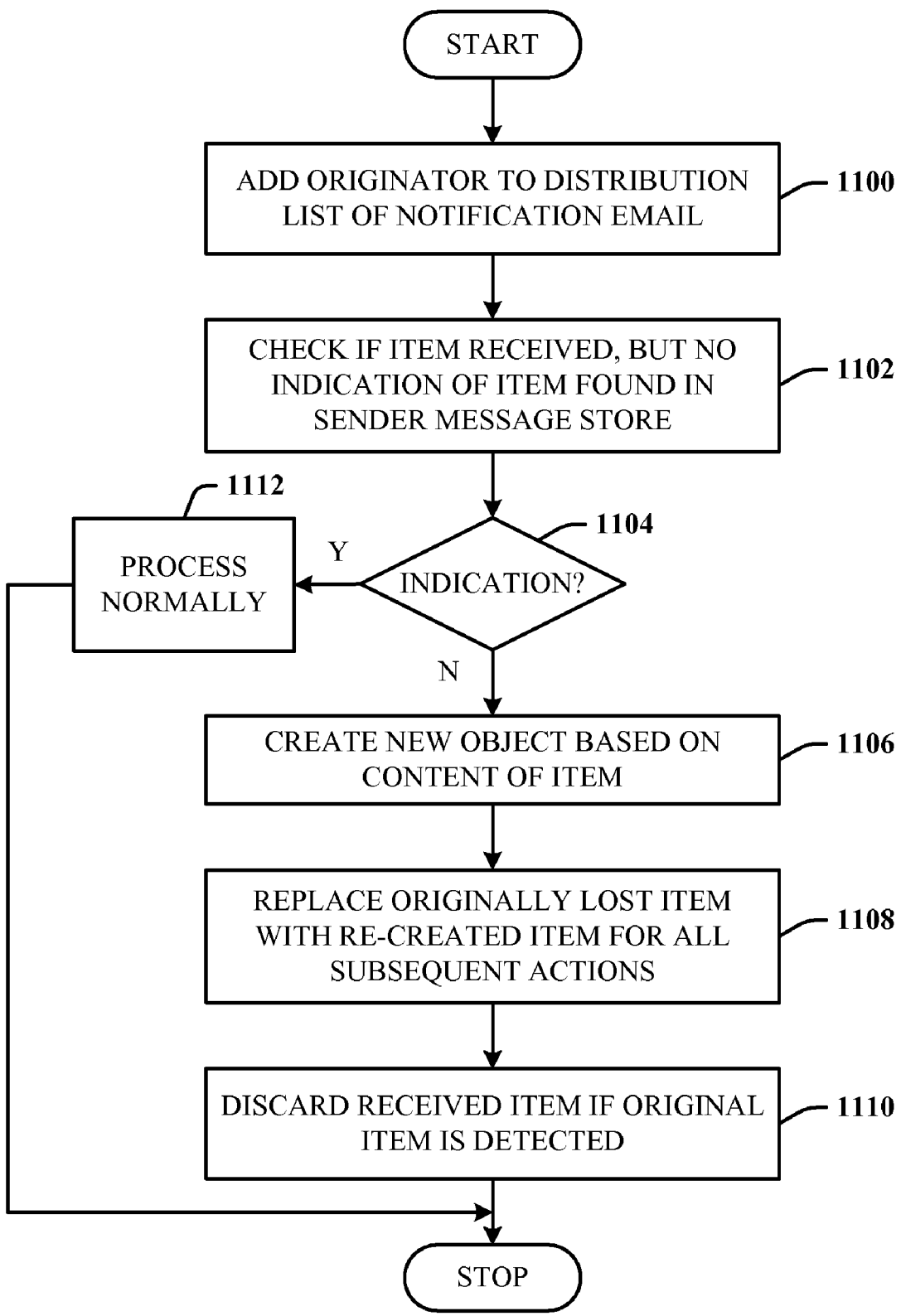
FIG. 11 illustrates a method of processing Group Three changes.

As described hereinabove, the Group Three includes changes performed on an item of an originator. These changes are distributed to messaging system recipients. FIG. 11 illustrates a method of processing Group Three changes. The method is in the context of an email item; however, it is to be understood that the method applies to data, in general, as well.

Changes might result in a state where everyone but the originator knows about the changes. For example, consider a meeting appointment or the addition of a recipient to a distribution list. If an object is updated and just the object knows about the update, this can be resolved. When a meeting request is created, two things happen: the meeting request is entered in the calendar and then is sent to everybody invited to the meeting. Thus, when the originator user schedules a meeting with other users, there will be an indication in the calendar and a message is sent in the inbox. The system handles this case correctly where the indication disappears out of the calendar.

In processing the history, the indication gets put into the calendar and invites are sent to all the users that were invited to the meeting. This causes duplicate meeting requests to appear in the originator's inbox. The system detects and deletes these duplicates. Thus, Group Three changes are managed by ensuring that in the process of putting a meeting request back, there may be information sent out that already exists elsewhere in the system. The system manages this by detecting and deleting the duplicates to prevent further complications that could result if duplicates where disseminated through the system.

At 1100, an originator is added to a distribution list of a notification email. At 1102, a check is performed to determine if an item is received but no indication of the item is found within the senders messaging store. At 1104, if no indication is found, a new object is created based on the content of the item, as indicated at 1106. At 1108, the re-created item replaces the originally lost item for all subsequent actions. At 1110, the received item is discarded if the original item is detected. Additionally, the received item is not made visible to the user. If there is an indication of the item in the sender message store, flow is from 1104 to 1112 to process the item normally.

Figure 12:
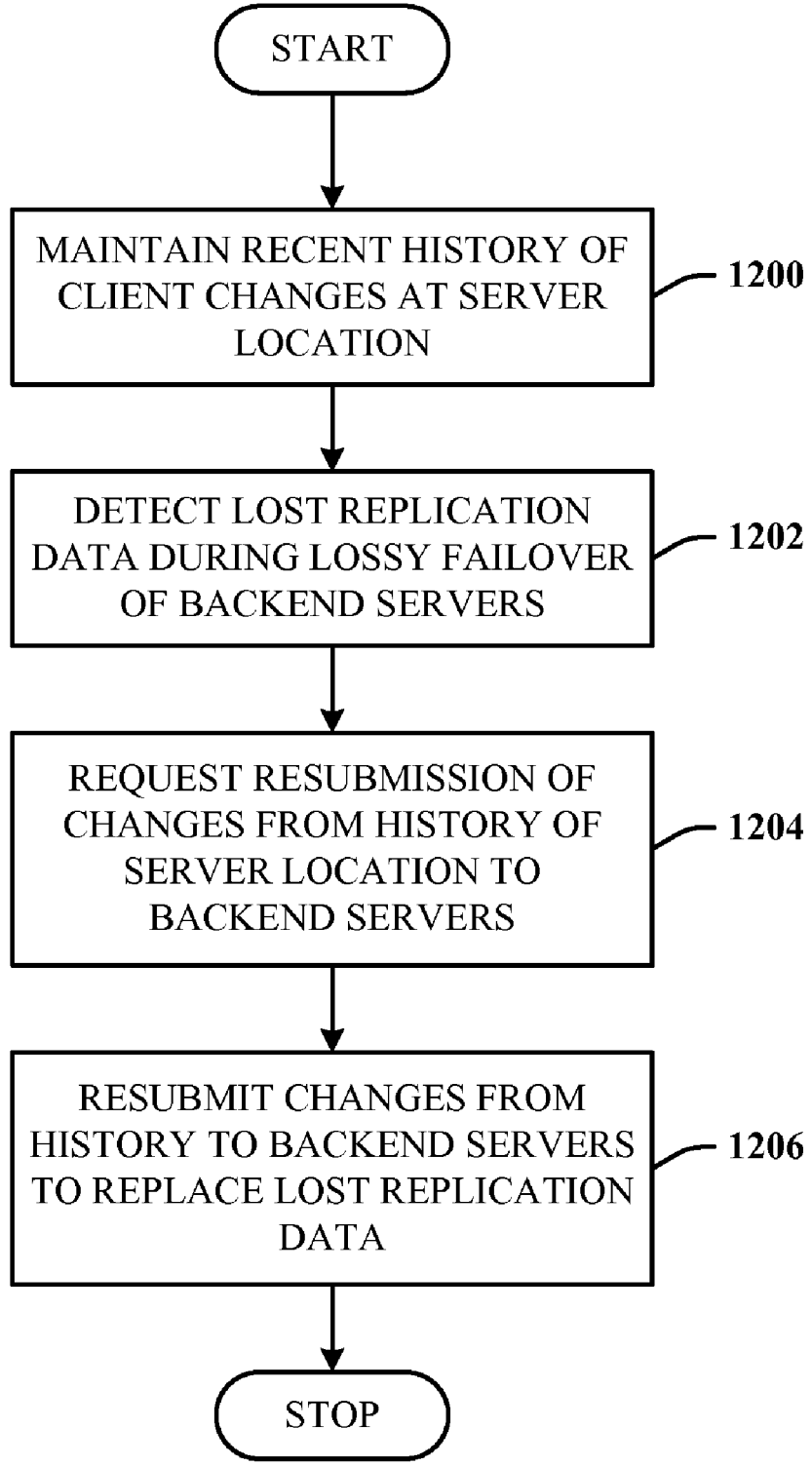
FIG. 12 illustrates a method of computer-implemented data management.

FIG. 12 illustrates a method of computer-implemented data management. At 1200, a recent history of client changes is maintained at a server location. At 1202, lost replication data is detected during lossy failover of backend servers. At 1204, resubmission of the changes is requested from the history of the server location to the backend servers. At 1206, changes from the history are resubmitted to the backend servers to replace the lost replicated data.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 13:
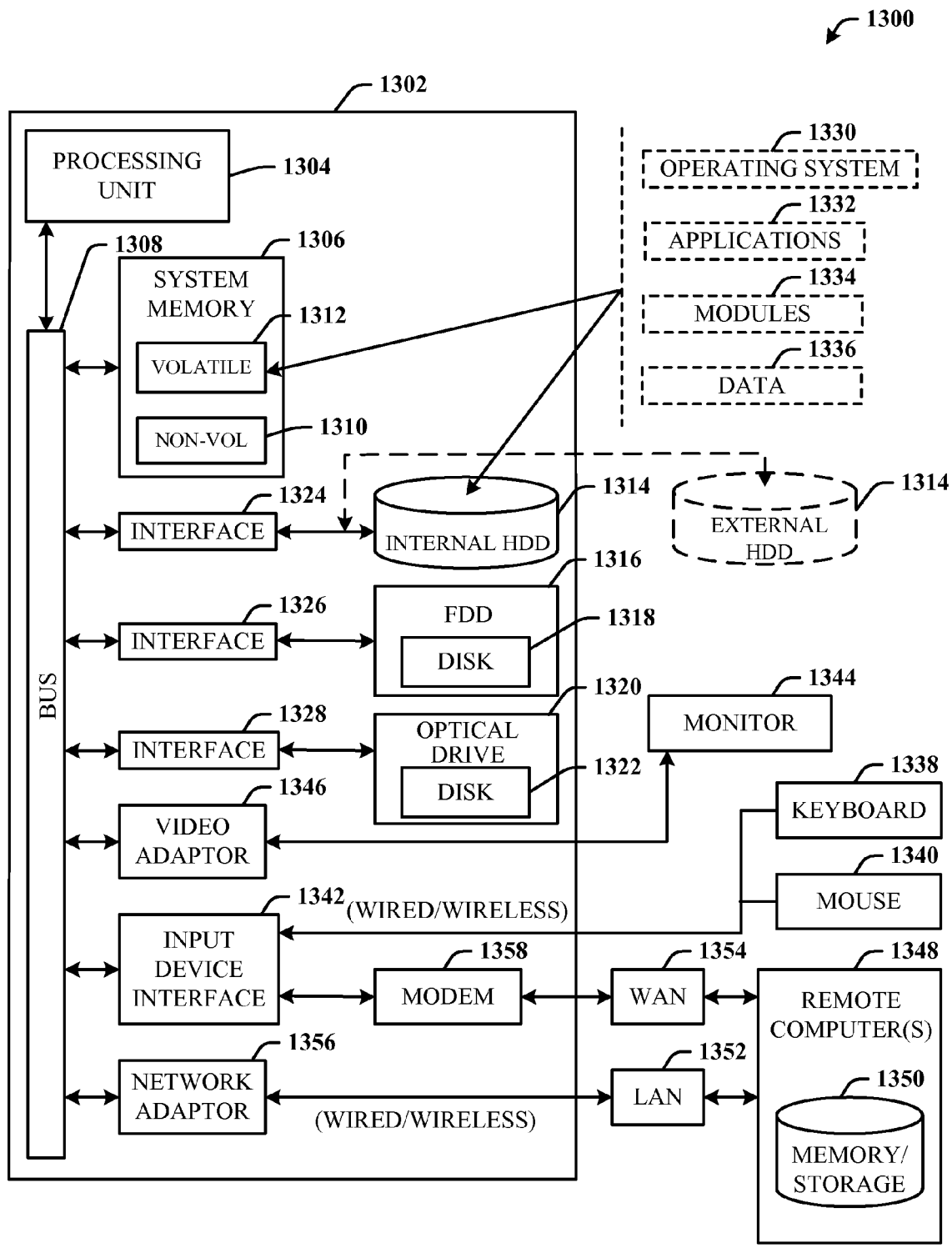
FIG. 13 illustrates a block diagram of a computing system operable to execute computer-implemented data management systems in accordance with the disclosed architecture.

Referring now to FIG. 13, there is illustrated a block diagram of a computing system 1300 operable to execute computer-implemented data management systems in accordance with the disclosed architecture. In order to provide additional context for various aspects thereof, FIG. 13 and the following discussion are intended to provide a brief, general description of a suitable computing system 1300 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary computing system 1300 for implementing various aspects includes a computer 1302 having a processing unit 1304, a system memory 1306 and a system bus 1308. The system bus 1308 provides an interface for system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 can include non-volatile memory (NON-VOL) 1310 and/or volatile memory 1312 (e.g., random access memory (RAM)). A basic input/output system (BIOS) can be stored in the non-volatile memory 1310 (e.g., ROM, EPROM, EEPROM, etc.), which BIOS are the basic routines that help to transfer information between elements within the computer 1302, such as during start-up. The volatile memory 1312 can also include a high-speed RAM such as static RAM for caching data.

The computer 1302 further includes an internal hard disk drive (HDD) 1314 (e.g., EIDE, SATA), which internal HDD 1314 may also be configured for external use in a suitable chassis, a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as a DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1312, including an operating system 1330, one or more application programs 1332, other program modules 1334, and program data 1336. All or portions of the operating system, applications, modules, and/or data can also be cached in the volatile memory 1312. It is to be appreciated that the disclosed architecture can be implemented with various commercially available operating systems or combinations of operating systems.

The aforementioned application programs 1332, other program modules 1334, and program data 1336, when implemented as a server system, can include the history component 102, the history 104, the backend servers 108, and the storage component 110 from FIG. 1, the frontend server system 200 and associated entities (206 and 208), the mid-tier server system 202 and associated entities (212 and 214), the replication component 302, failover detection component 304, resubmission component 306, duplicate detection component 308 for the backend servers 108, the pruning component 310 and replication feedback channel 312 for the storage component 110, the frontend pruning component 402, the frontend replication feedback channel 404, the mid-tier pruning component 406, and the mid-tier replication feedback channel 408, for example.

The application programs 1332, other program modules 1334, and program data 1336, when implemented as a server system, can also include methods described in FIGS. 7-12.

A user can enter commands and information into the computer 1302 through one or more wire/wireless input devices, for example, a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, etc.

A monitor 1344 or other type of display device is also connected to the system bus 1308 via an interface, such as a video adaptor 1346. In addition to the monitor 1344, a computer typically includes other peripheral output devices (not shown), such as speakers, printers, etc.

The computer 1302 may operate in a networked environment using logical connections via wire and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, is connected to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 14:
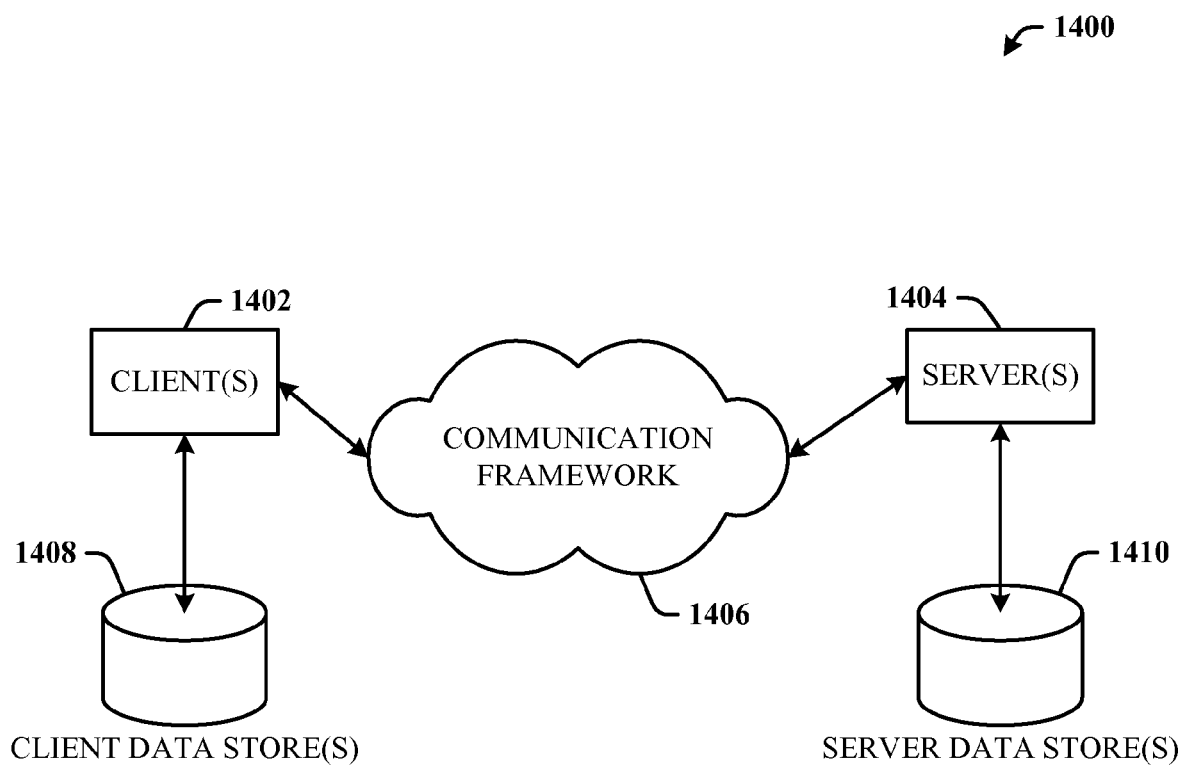
FIG. 14 illustrates a schematic block diagram of an exemplary computing environment that interacts with a computer-implemented data replication system.

Referring now to FIG. 14, there is illustrated a schematic block diagram of an exemplary computing environment 1400 that interacts with a computer-implemented data replication system. The environment 1400 includes one or more client(s) 1402. The client(s) 1402 can be hardware and/or software (e.g., threads, processes, computing devices). The client(s) 1402 can house cookie(s) and/or associated contextual information, for example.

The environment 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The environment 1400 includes a communication framework 1406 (e.g., a global communication network such as the Internet) that can be employed to facilitate communications between the client(s) 1402 and the server(s) 1404.

Communications can be facilitated via a wire (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The server data store(s) 1410 can be part of the storage component 110 for storing histories of changes. The server data store(s) 1410 can also represent the backend databases that failover, such as for messaging databases or mailboxes. The server(s) 1404 can include the frontend server system 200 and mid-tier server system 202, and backend servers 108, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data management system, comprising:
    a history component for maintaining a history of changes made by clients to backend servers;
    a storage component for storing the history of the changes for resubmission of the changes in response to a lossy failover of the backend servers;
    a pruning component for pruning outdated history items from the history based in part on a replication feedback channel; and
    a processor that executes computer-executable instructions associated with at least the history component.

2. The system of claim 1, wherein the history component is part of a frontend server for resubmission of a recent history of the changes from the frontend server to the backend servers.

3. The system of claim 1, wherein the history component is part of a middle-tier server for resubmission of a recent history of the changes to the backend servers.

4. The system of claim 1, further comprising a failover detection component for detecting a lossy failover of the backend servers during data replication.

5. The system of claim 1, further comprising a resubmission component for resubmitting changes of the history to the backend servers in response to detection of a lossy failover.

6. The system of claim 1, further comprising a resubmission component for defining a time interval that defines which items of the history to resubmit.

7. The system of claim 1, wherein the history includes at least one of mid-tier server or frontend server operations selected from operations that create a new messaging object, operations that update an existing object, or operations that are performed on an original item and are distributed to recipients.

8. The system of claim 1, further comprising a timestamp at which the changes are up-to-date and correct, the pruning component expires changes from the history that are older than the timestamp.

9. The system of claim 1, further comprising a time interval, defined by the replication feedback channel, for which items in the history are considered for resubmission.

10. The system of claim 1, further comprising resubmission progress, periodically obtained from the backend servers, represented as a timestamp of changes successfully resubmitted.

11. A computer-implemented data management system, comprising:
    a history component for maintaining a history of recent changes made by clients to mid-tier and/or frontend servers, the history includes changes related to update of an existing messaging object, the changes and backend version information of the object are stored in the history;

a failover detection component for detecting lossy failover of asynchronous replication of data to backend servers;

a resubmission component for requesting resubmission of the recent changes from the history to fill in the changes lost during the replication; and a processor that executes computer-executable instructions associated with at least one of the history component, the failover detection component, or the resubmission component.

12. The system of claim 11, wherein the resubmission component sends a request to the mid-tier and/or frontend servers to resubmit changes defined within a time range.

13. The system of claim 11, further comprising a duplicate detection component for detecting duplications between the recent changes resubmitted and data replicated at the backend servers.

14. The system of claim 11, wherein the history includes changes related to creation of a new messaging object, identity information of the new messaging object, and a global unique ID for the new messaging object.

15. The system of claim 11, wherein the history includes changes performed on an item of an originator, and which changes are distributed to messaging system recipients.

16. A computer-implemented method of data management, comprising acts of:

maintaining a recent history of client changes at a server location including changes in the history related to creating a new messaging object and updating an existing messaging object;

detecting lost replication data during lossy failover of backend servers;

requesting resubmission of the changes from the history of the server location to the backend servers;

resubmitting the changes from the history to the backend servers to replace the lost replication data; and utilizing a processor that executes instructions stored in memory to perform at least one of the acts of maintaining, detecting, requesting, or resubmitting.

17. The method of claim 16, further comprising employing a feedback loop from the backend servers to the server location to coordinate the history with replication history.

18. The method of claim 16, further comprising defining a time interval within which recent changes of the history will be resubmitted, the recent changes associated with timestamp information.

19. The method of claim 16, further comprising:

processing the recent changes of the history beginning with the oldest history entry;

detecting and removing duplicates; and removing successfully replicated changes from the history as soon as replication of the changes is successful.

20. The method of claim 16, further comprising maintaining the history based on at least one of time data or size data.

* * * * *